(12) United States Patent
Fung

(10) Patent No.: US 9,199,561 B2
(45) Date of Patent: Dec. 1, 2015

(54) MULTI-FUNCTIONAL CAR SEAT GAP FILLING DEVICE

(71) Applicant: Wai Wing Fung, Sheung Shui (HK)

(72) Inventor: Wai Wing Fung, Sheung Shui (HK)

(*) Notice: Subject to any disclaimer, the term of this patent is extended or adjusted under 35 U.S.C. 154(b) by 16 days.

(21) Appl. No.: 13/917,218

(22) Filed: Jun. 13, 2013

(65) Prior Publication Data

US 2013/0334845 A1 Dec. 19, 2013

(30) Foreign Application Priority Data

Jun. 14, 2012 (CN) .......................... 2012 2 0278809

(51) Int. Cl.
  *A47D 15/00* (2006.01)
  *B60N 2/44* (2006.01)
  *B60N 2/60* (2006.01)

(52) U.S. Cl.
  CPC ................ *B60N 2/44* (2013.01); *B60N 2/6009* (2013.01)

(58) Field of Classification Search
  CPC .............. A47C 1/04; A47C 7/62; A47D 1/00; A47D 1/008; A47D 15/00; B60N 2/44; B60N 2/6009; B60N 2/7005; B60R 7/043; B60R 11/00; B60R 2011/0059; B60R 2011/0063
  USPC .................... 297/182, 188.01, 188.2, 188.04, 297/188.06–188.08, 188.12, 481–482, 226
  See application file for complete search history.

(56) References Cited

U.S. PATENT DOCUMENTS

| | | | | |
|---|---|---|---|---|
| 5,358,307 | A | * | 10/1994 | Shafer et al. ................ 297/188.2 |
| 5,735,270 | A | * | 4/1998 | Bayer ...................... 128/206.14 |
| 6,022,072 | A | * | 2/2000 | Moyer .......................... 297/182 |
| 7,431,394 | B2 | * | 10/2008 | Neustat ...................... 297/219.1 |
| 8,336,963 | B1 | * | 12/2012 | DeMonaco ............... 297/411.23 |
| 2007/0108787 | A1 | * | 5/2007 | Dohan ....................... 296/37.15 |
| 2007/0241581 | A1 | * | 10/2007 | Martin ......................... 296/37.8 |
| 2008/0283565 | A1 | * | 11/2008 | Simon et al. .................. 224/542 |
| 2009/0039122 | A1 | * | 2/2009 | Antonioni .................... 224/250 |
| 2009/0134688 | A1 | * | 5/2009 | Waltman et al. ............ 297/463.2 |
| 2009/0224563 | A1 | * | 9/2009 | Gregory ...................... 296/1.07 |
| 2009/0315381 | A1 | * | 12/2009 | Longnecker ............. 297/411.23 |
| 2010/0231010 | A1 | * | 9/2010 | Manley ......................... 297/182 |
| 2012/0242115 | A1 | * | 9/2012 | Schreiber ................. 297/180.12 |
| 2013/0068919 | A1 | * | 3/2013 | Antonioni .................... 248/614 |

OTHER PUBLICATIONS

Richard Cardenas, Eliminate Crack Bummer with the Gap Pal, April 19, 2013, Popcults.com, http://www.popcults.com/eliminate-crack-bummer-with-the-gap-pal/.*

* cited by examiner

*Primary Examiner* — Daniel J Troy
*Assistant Examiner* — Ryan A Doyle
(74) *Attorney, Agent, or Firm* — Kinney & Lange, P.A.

(57) ABSTRACT

A multi-functional car seat gap filling device, comprising: an elastic rod-shaped body, at least one of the head and middle parts thereof being fitted with a storage pocket, and the tail part thereof being fitted with a through hole or an elastic band to engage a seatbelt buckle; an elastic band, one end thereof being attached to the bottom of the head of the rod-shaped body; and a small elastic ball or round stopper, which is fitted on the other end of the elastic band. The rod-shaped body is inserted into the top of a gap between the driver seat and storage compartment in a vehicle interior, the buckle of the driver seat safety belt passes through the through hole, and the small elastic ball or round stopper is locked into the bottom of the gap. The device functions to fill in gaps and hold small articles such as mobile phones, media players, and pens, rendering the vehicle interior neat and tidy and more conducive to safe driving.

8 Claims, 8 Drawing Sheets

MULTI-FUNCTIONAL CAR SEAT GAP FILLING DEVICE

BACKGROUND

The present invention relates to a multi-functional car seat gap filling device, utilizing sewing techniques to combine elastic fiber cloth and a filler such as Cellucotton into an elastic device that can be used in filling vehicle seat gaps while also functioning to hold small articles such as mobile phones, media players, cards, coins and pens and the like.

At present, the vast majority of purchased cars contain a gap between the driver seat or front passenger seat and a storage compartment. Small items dropped by the driver or passenger into the space between the seat and storage compartment are very difficult to retrieve. In particular, most drivers who drop items while driving are eager to retrieve these immediately, which presents a considerable danger. Drivers and passengers will often accidently drop small articles (e.g. mobile phones, business cards, coins and the like) into the gaps, and tend to expend a lot of energy in trying to retrieve said articles, which on occasion results in unnecessary trouble and danger.

To prevent the occurrence of such a problem, some drivers conceive the idea of filling up the gaps with various materials. The use of adhesive items to secure in place these fillers will impede the normal forward and back adjustment of the seat and inflict permanent damage. If adhesive items are not used, the fillers cannot be fixed in place, such that use thereof is ultimately abandoned.

SUMMARY

In order to avoid the tendency for small items to fall into and become concealed in the gap between automotive seats and storage compartment, thus being difficult to retrieve, and to allow the driver to appropriately store small items in a fashion conducive to safe driving, the present invention provides a multi-functional car seat gap filling device. Elastic fiber cloth and a filler of fibrous material (such as Cellucotton, U.S. Trademark Registration No. 0126706) are combined together to form an elastic device for filling car seat gaps that contains at least one storage pocket. The insertion of the device over the gap between the driver seat and storage compartment in a vehicle interior accomplishes filling (or blocking) of said gap, while also rendering convenient the placement of small articles such as mobile phones, media players, cards and pens.

In one embodiment, the multi-functional car seat gap filling device comprises:

An elastic rod-shaped body, at least one of the head and middle parts thereof being fitted with a storage pocket, and the tail part thereof being fitted with a through hole;

An elastic band, one end thereof being attached to the bottom of the head of the rod-shaped body; and A small elastic ball or round stopper, which is fitted on the other end of the elastic band;

The rod-shaped body is inserted over or into the top of a gap between the driver seat and storage compartment in a vehicle interior, the buckle of the driver seat safety belt is held in an engagement with the tail of the rod-shaped body (e.g., by a slot or through hole in the body or an elastic band along a side of the tail of the body), and the stopper is locked into the bottom of the gap, thereby positioning the head of the rod-shaped body.

Further, a pair of external bands are fitted on each side of the storage pocket in the rod-shaped body head part, and a separate pair of external bands are fitted on each side of the storage pocket in the rod-shaped body middle part, used for the horizontal accommodation of small articles such as pens.

The outer layer of the rod-shaped body is an elastic fiber cloth layer, the second outermost layer is a polyurethane (PU) layer, and the interior is padded with Cellucotton, which is covered by another layer of elastic fiber cloth.

The outer layer of the rod-shaped body may be an elastic fiber cloth layer, and the interior padded with Cellucotton.

The small elastic ball is an inflatable rubber ball, a cloth ball filled with Cellucotton, or a cloth ball filled with foam rubber.

The small elastic ball may be replaced by a ball with fixed shape, such as a plastic ball.

The elastic band is a strip of elastic adhesive tape or elastic cloth tape provided with an adhesive inner side.

The multi-functional car seat gap filling device may be composed of PU material and Cellucotton, which are combined into a malleable elastic rod-shaped body to which is added an elastic band and a small elastic ball or round stopper, thereby serving to ensure that the device retains its upright position when used in apertures of different dimensions, while also being convenient for storing items. Items held therein will not be scratched or damaged, and the traditional drawback of the driver accidentally dropping small articles into the gap is circumvented.

The present device is inserted into or over the gap between an automotive seat and storage compartment, the buckle of the driver seat safety belt passes through the through hole or between an external elastic band and the body, and the small elastic ball or round stopper is locked into the bottom of the gap between the seat and storage compartment. As the buckle of the driver seat safety belt and the small elastic ball (or round stopper) position the device into place, there is no need for any binder substances, and the device is suited for use in a wide range of vehicle types.

The two storage pockets and plurality of external bands provided on the present device can accommodate small articles such as mobile phones, media players, cards, coins, pens and the like, rendering the vehicle interior neat and tidy and more conducive to safe driving.

DETAILED DESCRIPTION

Figure 1:
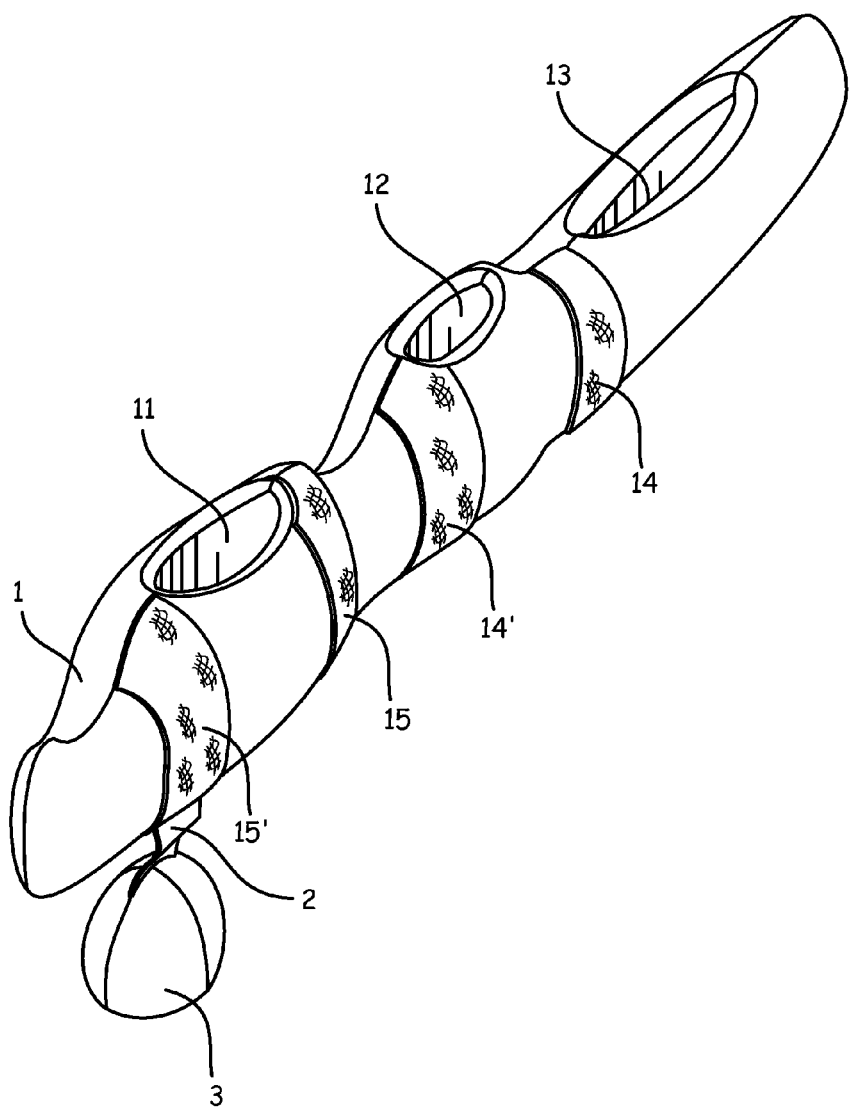
FIG. 1 is a schematic view of an embodiment of a multi-functional gap filling device.

Referring to FIG. 1, the depicted multi-functional car seat gap filling device comprises: an elastic rod-shaped body 1, the head part of the rod-shaped body 1 being fitted with a storage pocket 11, the middle part being fitted with a storage pocket 12, and the tail part fitted with a through hole 13 used in accommodating the buckle of the driver's seat safety belt; an elastic band 2, one end of the elastic band 2 being attached to the bottom of the head of the rod-shaped body 1; and a small elastic ball 3, which is fitted on the other end of the elastic band 2.

The rod-shaped body 1 is relatively thick at the positions where said storage pocket 11 and storage pocket 12 are installed. A pair of external bands 15, 15' are fitted respectively on each side of the storage pocket 11 in the head part of the rod-shaped body 1, and a separate pair of external bands 14, 14' are fitted respectively on each side of the storage pocket 12 in the middle part of the rod-shaped body 1, used for the horizontal accommodation of small articles such as pens and rechargers. These external bands may use rubber bands and the like for convenient insertion of pens etc.

Figure 2:
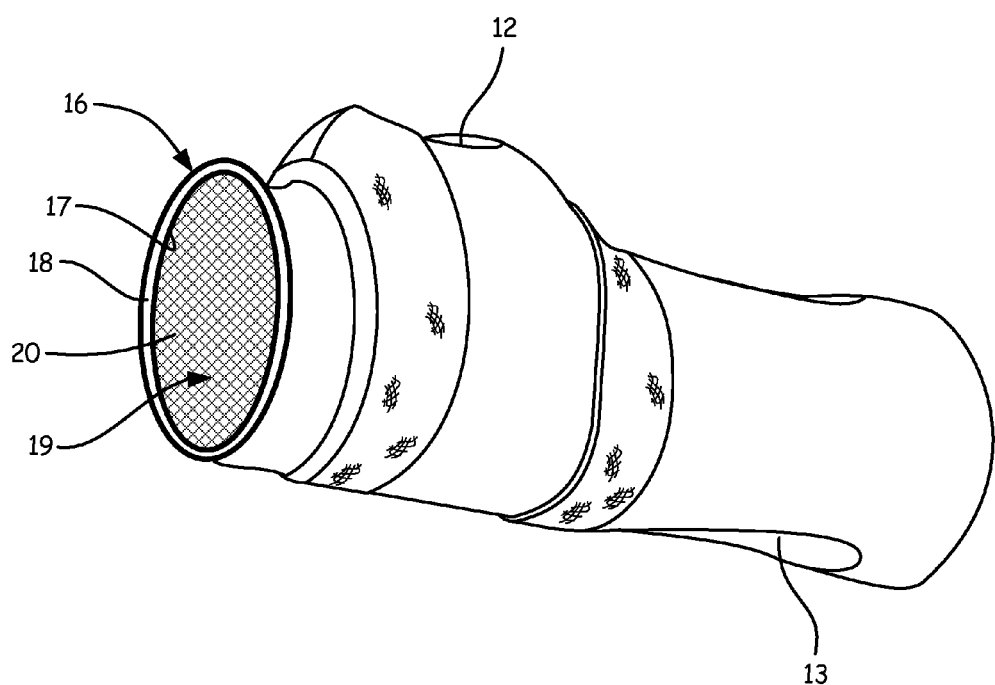
FIG. 2 is a schematic view of the internal structure of the device of FIG. 1.

Referring to FIG. 2, in order to impart favorable elasticity to the rod-shaped body 1, the outer layer 16 is made of elastic fiber cloth, the second outermost layer 18 is a polyurethane (PU) layer, and the interior 19 is padded with fibrous material 20 such as Cellucotton, which is covered by another layer of elastic fiber cloth 17.

The outer layer of the rod-shaped body 1 may also be an elastic fiber cloth layer, and the interior of the elastic fiber cloth layer directly padded with Cellucotton.

The small elastic ball 3 is an inflatable rubber ball, a cloth ball filled with Cellucotton, or a cloth ball filled with foam rubber.

The elastic band 2 is a strip of elastic adhesive tape or elastic cloth tape provided with an adhesive inner side.

Figure 3:
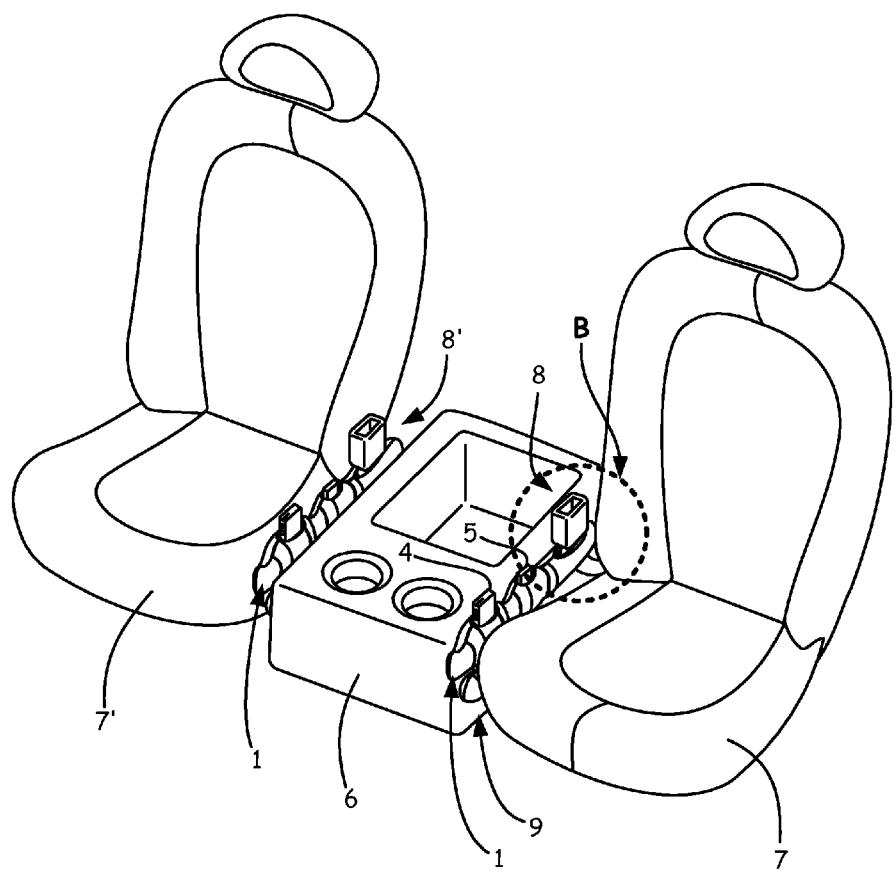
FIG. 3 is a perspective view showing the fitting of the device of FIG. 1 into the gaps between the driver/passenger seats and the storage compartment.
Figure 4:
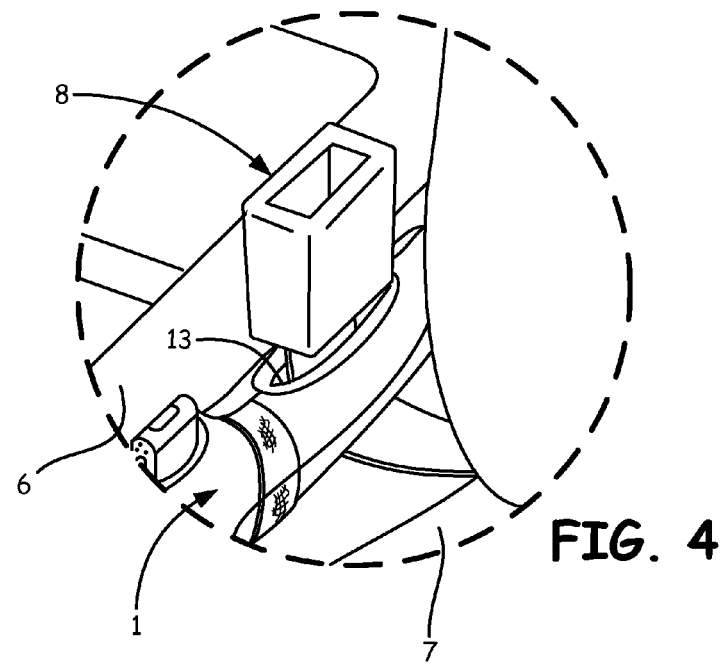
FIG. 4 is an exploded view of B in FIG. 3.
Figure 5:
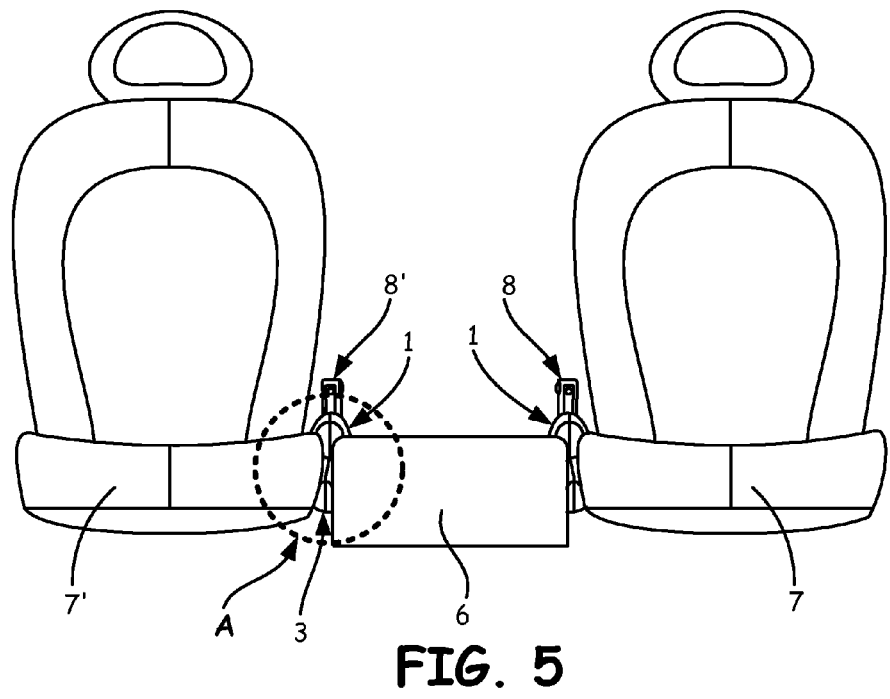
FIG. 5 is a front view of FIG. 3.
Figure 6:
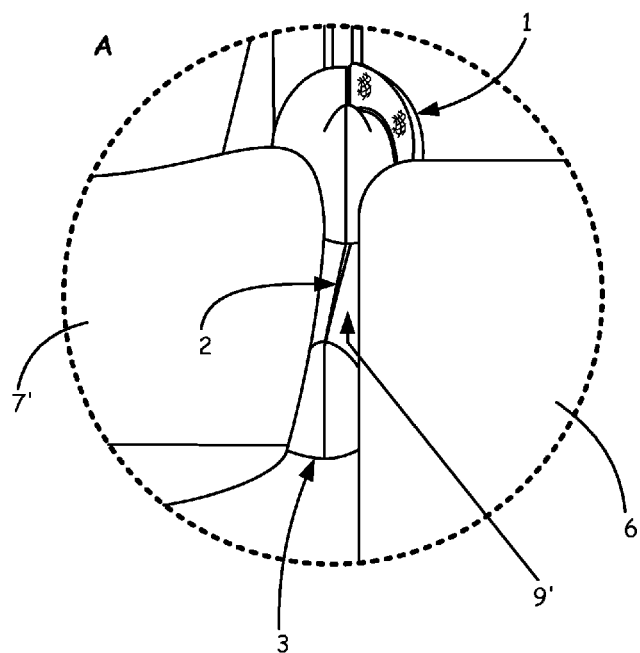
FIG. 6 is an exploded view of A in FIG. 3.

Refer to FIGS. 3-6 for the installation and use of the device shown in FIG. 1. In FIGS. 3 and 5, the device shown in FIG. 1 is installed in the gap 9 between the driver seat 7 and storage compartment 6, wherein the rod-shaped body 1 is inserted into the top of the gap 9 between the driver seat 7 and storage compartment 6, and secured in place by passing the safety belt buckle 8 on the driver seat 7 through the through hole 13 (FIG. 4). The small elastic ball 3 is locked into the bottom of the gap 9 (cf. FIG. 5), preventing movement of the rod-shaped body 1. In FIGS. 3, 4 is a mobile phone inserted into storage pocket 11, and 5 is a media player inserted into storage pocket 12.

Another FIG. 1 device is installed into the gap 9' between the passenger seat 7' and storage compartment 6 in the same manner as described above. As shown in the exploded view of FIG. 6, the rod-shaped body 1 of the device is inserted into the top of the gap 9', and secured in place by passing the safety belt buckle 8' on the passenger seat 7' through the through hole 13 of the rod-shaped body 1. The elastic band 2 is positioned in the gap 9', and exerts tension on the small elastic ball 3, which is locked into the bottom of gap 9' to prevent movement of the rod-shaped body 1.

As the rod-shaped body 1 of the device shown in FIG. 1 exhibits good elasticity, combined with the design of the elastic band 2 and small elastic ball 3, this allows the device to retain an upright position when used in gaps of different dimensions, so that it is suitable for use in a range of vehicle types while also being convenient for the storage of small articles.

Said small elastic ball may be in the form of a ball of fixed dimensions, such as a hollow plastic ball. Said small elastic ball may also be in the form of a round stopper, where the thickness of the round stopper is 15 to 30 percent of its diameter.

Figure 7:
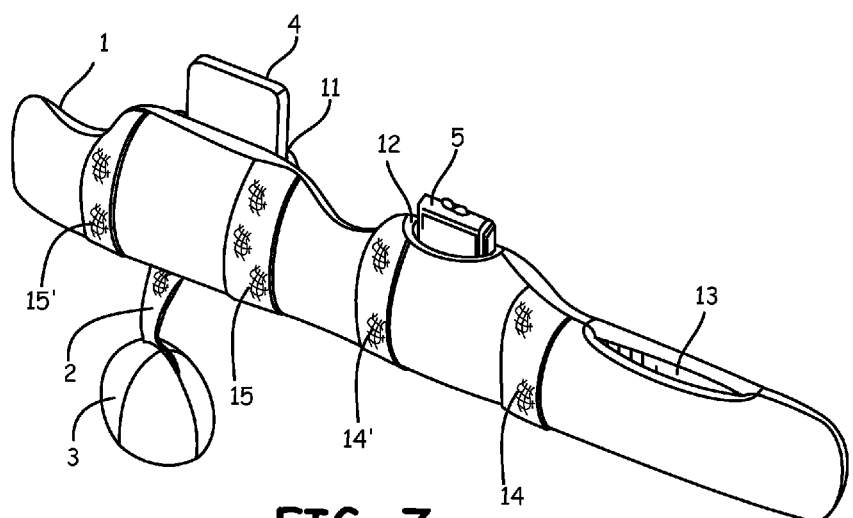
FIG. 7 is a schematic view of another embodiment of the multifunctional gap filling device.

FIG. 7 depicts another embodiment of the device. The main structural features of the device shown in FIG. 7 are identical to those of the device in FIG. 1; the difference is that said small elastic ball 3 is in the form of a round stopper, where the upper end of elastic band 2 is attached to the bottom of the head part of the rod-shaped body 1, and the round stopper 3 is fitted on the lower end of the elastic band 2.

The installation and use of the device shown in FIG. 7 are essentially identical to the device shown in FIG. 1. The rod-shaped body 1 is inserted into the top of the gap between the driver seat and storage compartment, and secured in place by passing the safety belt buckle on the driver seat through the through hole 13 on the rod shaped body 1. The round stopper 3 passes though the gap and rotates 90 degrees to lock into the bottom of the gap, preventing movement of the rod-shaped body 1.

Figure 8A:
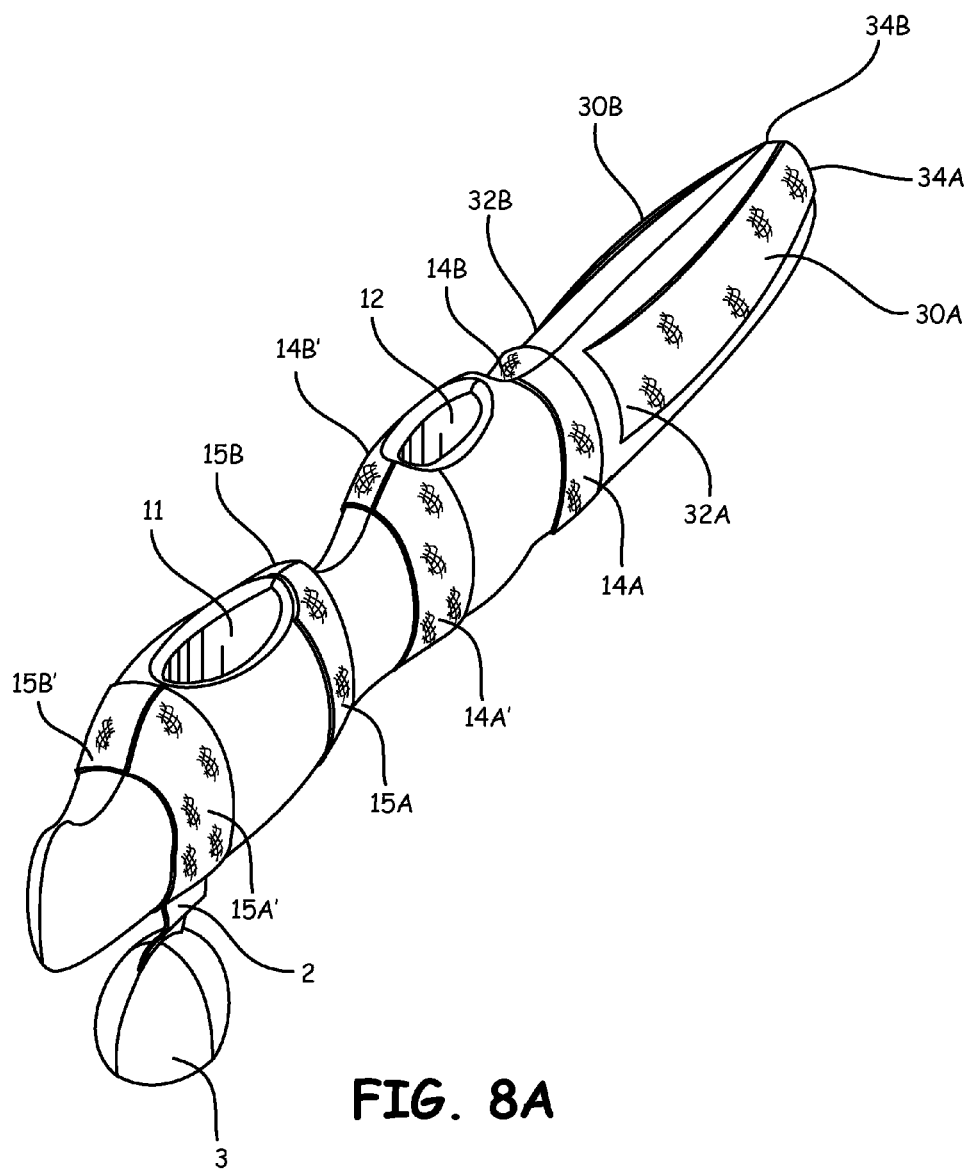
FIGS. 8A-8C show another embodiment of the multifunctional gap filling device having elastic bands or straps for connecting the device to a seatbelt buckle.
Figure 8B:
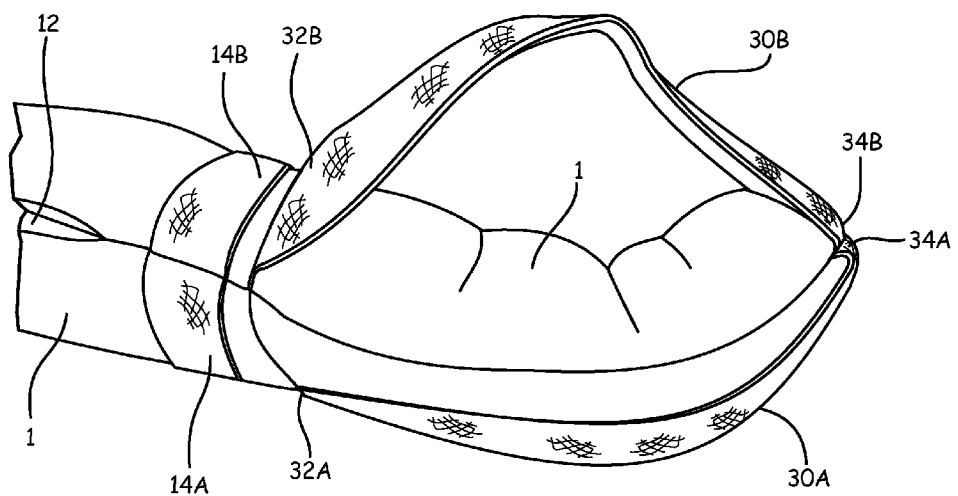
Figure 8C:
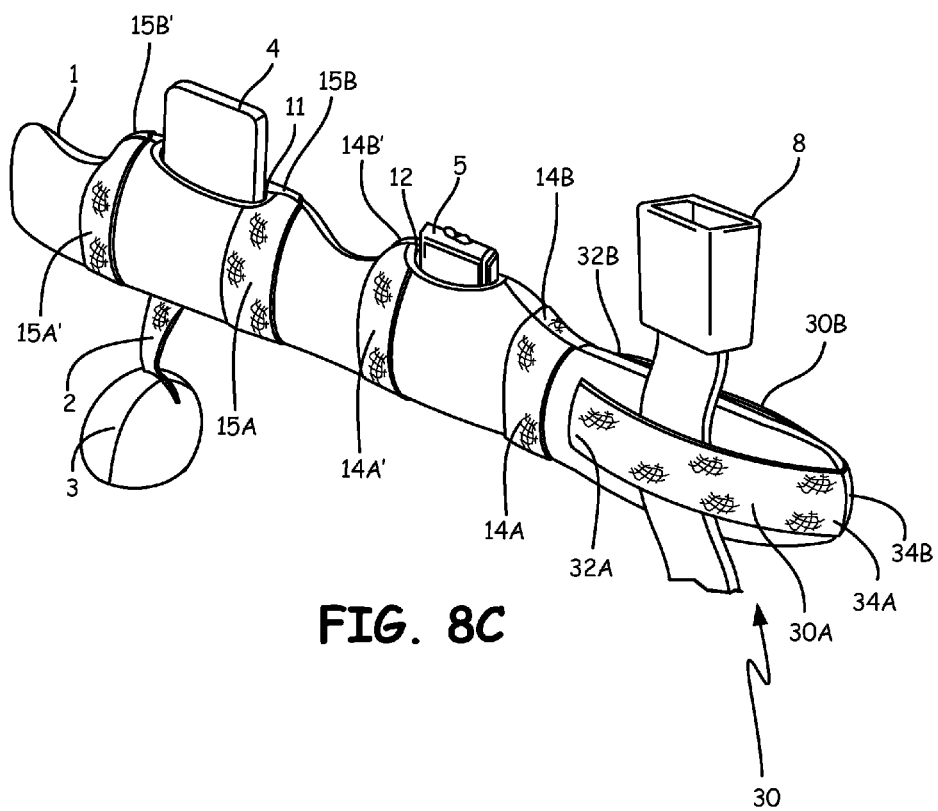

FIGS. 8A-8C show another embodiment that is similar to the embodiments of FIGS. 1-7, except that slot 13 used to connect the multifunctional gap filling device with safety belt buckle 8 or 8' has been eliminated. External elastic bands 30A and 30B are used to engage belt buckle 8 or 8' respectively, and to connect and position body 1 with respect to buckle 8 or 8A. Band 30A extends along the left side of the tail section of body 1 and is attached to body 1 (e.g. by stitching) at forward end 32A and rear end 34A of band 30A. Band 30B extends along the right side of body 1 and is attached to body 11 by stitching at forward end 32B and rear end 34B of band 30B.

In addition, external elastic bands 14A, 14A' and 14B', 15A and 15B, and 15A' and 15B' are located on left end right sides, respectively of body 1 to hold small articles such as pens, rechargers, ear buds, etc.

With external elastic bands 14A, 14B, 14A', 14B', 15A, 15B, 15A', 15B', 30A and 30B on opposite sides of body 1, the gap filling device can be used on either side of a center console.

FIG. 8B shows how band 30B can be stretched to separate from body 1. This allows a safety buckle (e.g., safety belt buckle 8') to be inserted through the space between second band section 30B and body 1. When band 30B is released, it will contract and hold body 1 against buckle 8'. Band 30A functions in a similar fashion.

FIG. 8C shows band 30A positioning and holding the tail section of body 1 with respect to safety belt buckle 8. In the embodiment shown, the head or receptacle portion of buckle 8 is located above elastic band 30A.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A multi-functional car seat gap filling device, comprising:
    an elastic rod-shaped body having a head part, a middle part, and a tail part, at least one of the head and middle parts thereof being fitted with a storage pocket, and the tail part thereof being fitted with a positioning device for engaging the elastic rod-shaped body with a driver seat safety belt, wherein an outer layer of the elastic rod-shaped body is an elastic fiber cloth layer, a second outermost layer is a polyurethane (PU) layer, and an interior is padded with fibrous material, which is covered by another layer of elastic fiber cloth;
    an elastic band, one end thereof being attached to a bottom of the head part of the elastic rod-shaped body; and a small ball, which is fitted on an end of the elastic band opposite the end attached to the bottom of the head part of the elastic rod-shaped body;

wherein when the elastic rod-shaped body is inserted into or over a top of a gap between a driver seat and storage compartment in a vehicle interior, the elastic rod-shaped body engages a buckle of the driver seat safety belt, and the small ball is locked into a bottom of the gap.

2. The device according to claim 1, characterized in that a pair of vertical external bands extending between a top and a bottom of the elastic rod-shaped body are forward and rearward of the storage pocket.

3. The device according to claim 2, characterized in that the pair of vertical external bands are vertical elastic bands.

4. The device according to claim 1, characterized in that the elastic band is a strip of elastic adhesive tape.

5. A device adapted to be disposed in an automotive vehicle between a seat and a central console of the automotive vehicle, the device comprising:

an elongated member including a casing having a top, a bottom, and a pair of opposed first and second sides, the casing enclosing a core, the first side adapted to abut the seat and the second side adapted to abut the central console, the elongated member configured to slide along the central console during longitudinal motion of the seat, wherein an outer layer of the elongated member is an elastic fiber cloth layer, a second outermost layer is a polyurethane (PU) layer, and an interior is padded with fibrous material, which is covered by another layer of elastic fiber cloth;

a positioning element adapted to receive a seatbelt component having one end anchored to a side of the seat, wherein the positioning element provides engagement to the seatbelt component when properly positioned adjacent the car seat to permit the elongated member to slide along the central console during longitudinal motion of the seat;

first and second storage pockets in the elongated member forward of the positioning element, each pocket having an open end at the top of the elongated member and a closed end within the elongated member;

an elastic band, one end thereof being attached to the bottom of the elongated member at a head section of the elongated member; and a small ball, which is fitted on an end of the elastic band opposite the end attached to the bottom of the elongated member.

6. The device of claim 5 and further comprising:

vertical external elastic bands extending between the top and the bottom of the elongated member, fitted forward and rearward of the first storage pocket and forward and rearward of the second storage pocket, and adjacent the first and second sides for holding articles in place against the first and second sides.

7. The device of claim 5, wherein the positioning element is a slot through the elongated member.

8. The device of claim 5, wherein the positioning element comprises a first horizontal external elastic band that extends along the first side of a tail section of the elongated member, wherein the seatbelt component is received and engaged between the first horizontal external elastic band and the first side of the tail section.

* * * * *